United States Patent [19]

Kokabu

[11] Patent Number: 4,545,446
[45] Date of Patent: Oct. 8, 1985

[54] HOPPER IN COMBINATORIAL WEIGHING APPARATUS

[75] Inventor: Rihei Kokabu, Shiga, Japan

[73] Assignee: Kabushiki Kaisha Ishida Koki Seisakusho, Kyoto, Japan

[21] Appl. No.: 609,211

[22] Filed: May 11, 1984

[30] Foreign Application Priority Data

May 11, 1983 [JP] Japan .............................. 58-71062[U]
Mar. 30, 1984 [JP] Japan .............................. 59-47445[U]

[51] Int. Cl.⁴ ..................... G01G 13/16; G01G 13/34; B65D 47/08; B61D 7/18
[52] U.S. Cl. .................................. 177/108; 177/112; 222/556; 105/282 A
[58] Field of Search ................................ 177/105–113, 177/25; 105/280, 282 A, 285; 222/146.5, 556

[56] References Cited

U.S. PATENT DOCUMENTS

| | | | |
|---|---|---|---|
| 261,257 | 7/1882 | Reuther | 177/105 |
| 871,630 | 11/1907 | Richardson | 177/111 X |
| 1,243,791 | 10/1917 | Zanone | 177/111 |
| 1,955,868 | 4/1934 | Wine | 105/280 |
| 2,676,733 | 4/1954 | Lober | 177/110 X |
| 3,596,609 | 8/1971 | Ortner et al. | 105/280 X |
| 3,878,794 | 4/1975 | Adler | 105/280 X |
| 4,256,950 | 3/1981 | Wildgruber | 222/146.5 |

Primary Examiner—George H. Miller, Jr.
Attorney, Agent, or Firm—Staas & Halsey

[57] ABSTRACT

A hopper for use in an automatic weighing apparatus, including a hopper body having a discharge port at a lower end of the hopper body, and a gate, swingably supported at an upper edge of the hopper body, for opening and closing the discharge port. The gate has a main body of which at least the left, right and lower edge portions are formed of a flexible material so that the edge portion comes into resilient contact with the inner surface of the discharge port.

17 Claims, 10 Drawing Figures

HOPPER IN COMBINATORIAL WEIGHING APPARATUS

BACKGROUND OF THE INVENTION

This invention relates to an automatic weighing apparatus and, more particularly, to improvements in a hopper in an automatic weighing apparatus suitable for weighing frozen foods.

An automatic weighing apparatus, now in practical use, operates by supplying articles to a plurality of weighing machines, computing combinations of weight values obtained from the weighing machines, selecting a combination of the weight values having a total weight equal to or closest to a predetermined fixed weight, and discharging only the articles contained in the weighing machines corresponding to the selected combination (referred to as the "optimum combination"), to obtain a batch of the articles having a weight equal or closest to the fixed weight.

In the automatic weighing apparatus of the type described, each of a plurality of weighing machines is equipped with a weighing hopper for accommodating a batch of articles therein, and with a pool hopper disposed above the weighing hopper, for quickly supplying the weighing hopper, with the next batch of articles to be weighed when the previously weighed batch of articles has been discharged from the weighing hopper.

Figure 1:
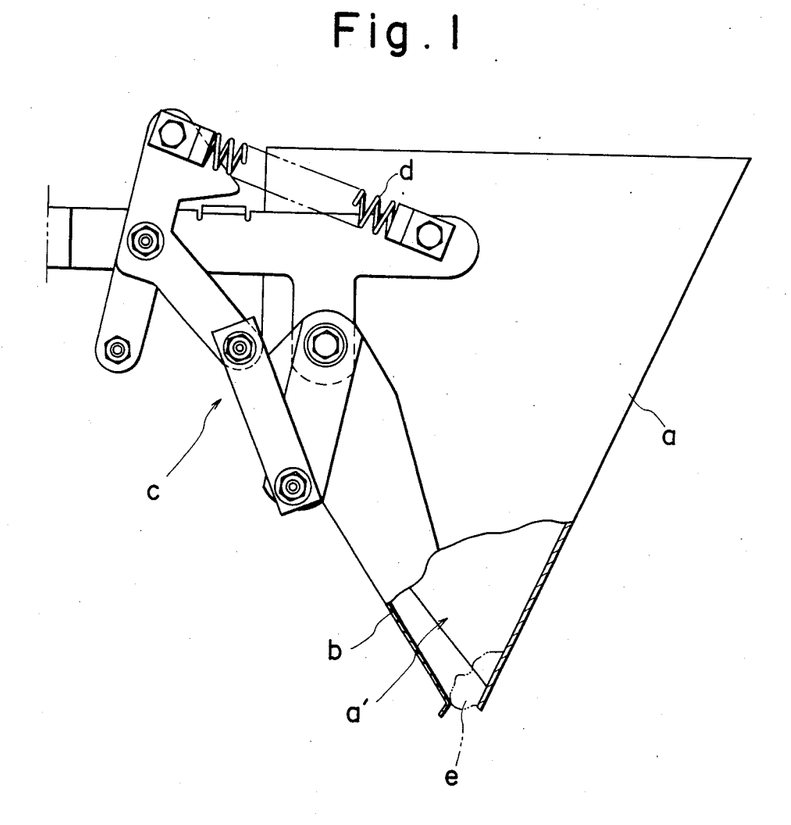
FIG. 1 is a side view illustrating a hopper according to the prior art.

As shown in FIG. 1, each of these hoppers has a hopper body a the lower end portion of which is provided with a discharge port a' from which articles are discharged. Each hopper further includes an openable and closable gate b provided at the discharge port a', a toggle-type link mechanism c actuatable under the control of an external force for opening and closing the gate b, which is also operable to lock the gate shut when the gate is closed, and a spring d which acts through the link mechanism c to bias the gate b in the closing direction.

The foregoing arrangement is beset by a number of problems where the articles being weighed are frozen foods, or where the automatic weighing apparatus is employed in a freezer chamber. Specifically, since the hoppers are chilled when the weighing apparatus finds use in the manner described, water contained in the frozen food or in the air itself in the form of moisture freezes on the hoppers to produce an icy deposit. When such a deposit forms, particularly at the discharge port a' of a hopper, as indicated at e in FIG. 1, the gate b contacts the deposit and is no longer capable of closing off the discharge port a'. As a result, articles introduced into the hopper will leak from the gap between the hopper body a and the gate b. Furthermore, with the gate b being unable to completely close the discharge port a', the link mechanism c is incapable of bringing the gate b to the home position, which is necessary to lock the gate in the closed state. Under such condition, moreover, only a small component of the biasing force applied by the spring d in the closing direction is capable of acting upon the gate b through the link mechanism c. For these reasons, the gate b tends to open naturally under the weight of the articles contained in the hopper body a, thereby contributing to leakage of the articles in the manner described above.

SUMMARY OF THE INVENTION

An object of the present invention is to provide a hopper for use in an automatic weighing apparatus, wherein a gate provided on the hopper can be brought to a predetermined closing position perfectly when the gate is to be closed, even if water contained in a frozed food or in the air forms a frozen deposit at the discharge port of the hopper when the automatic weighing apparatus is used to weigh out such foods or finds use in a freezer chamber.

Another object of the present invention is to provide a hopper for use in an automatic weighing apparatus, wherein weighed articles are prevented from leaking from the hopper owing to frozen deposits causing deformation at the discharge port of the hopper.

Still another object of the present invention is to provide a hopper for use in an automatic weighing apparatus, wherein residua from articles such as foodstuffs are prevented from attaching themselves to the inner wall of the hopper.

According to the present invention, the foregoing objects are attained by providing a hopper comprising a hopper body having a discharge port at the lower end thereof, and a gate swingably supported at the upper edge of the hopper body for opening and closing the discharge port, at least the edge portion of the gate being formed of a flexible material for resiliently contacting the inner surface of the discharge port.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 2:
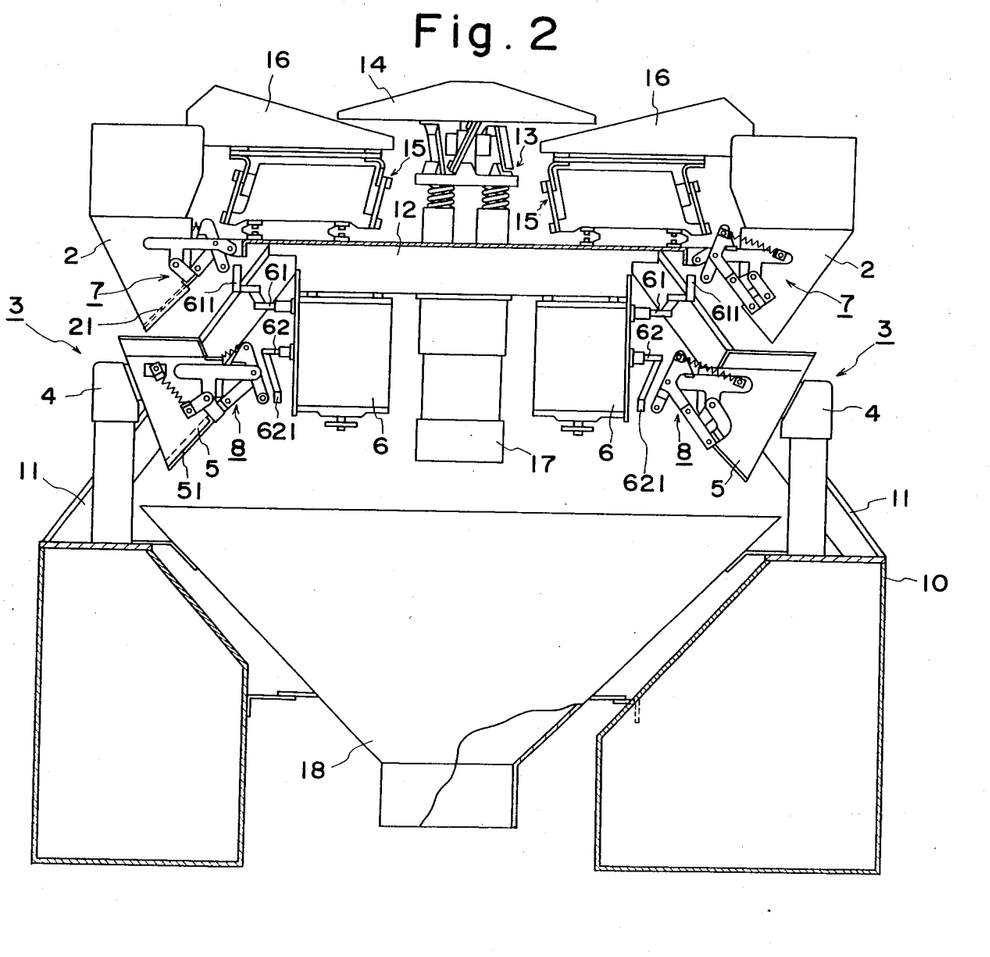
FIG. 2 is a sectional view showing the general features of an automatic weighing apparatus.

Reference will now be had to FIG. 2 showing an automatic weighing apparatus to which the present invention is applied. The automatic weighing apparatus has a base 10 which supports a platform 12 by means of a plurality of support legs 11. Disposed above the central portion of the platform 12 is a circular dispersing table 14 supported on the platform 12 by a vibrating device 13. Articles which drop onto the dispersing table 14 from a chute of a supply conveyor (not shown) migrate toward the outer edge of the table owing to vibration applied thereto by the vibrating device 13. The articles drop successively from the outer edge of the dispersing table 14 into a plurality of underlying, radially arranged troughs 16 surrounding the table. Each trough 16 is supported on the platform 12 by a corresponding vibrating device 15 the vibratory action of which causes the articles received from the dispersing table 14 to migrate from one end of the trough to the other or outer end, from which end the articles fall. Supported on the platform 12 are a plurality of pool hoppers 2 each of which corresponds to one of the troughs 16. Each pool hopper 2 is disposed below the outer end of the corresponding trough 16 to receive the articles which fall from the trough, and is provided with an openable and closable gate 21. A plurality of weighing machines 3 are disposed below corresponding ones of the pool hoppers 2. Each weighing machine 3 comprises a weight sensor 4 mounted on the base 1, and a weighing hopper 5 attached to the weight sensor 4 so as to underlie the corresponding pool hopper 2. Each weighing hopper 5 is provided with an openable and closable gate 51. A plurality of hopper drive units 6 depend from the lower side of the platform 12. Each hopper drive unit 6 corresponds to one cooperating set of the pool hoppers 21 and weighing hoppers 5. Each hopper drive unit 6 is equipped with two push-rods 61, 62, the distal ends of which have respective operating members 611, 621 attached thereto. When the push-rod 61 is thrust outwardly, the operating member 611 opens the gate 21 of the corresponding pool hopper 2 via a link mechanism 7. Likewise, when the push-rod 62 is thrust outwardly, the operating member 621 opens the gate 51 of the corresponding weighing hopper 5 via a link mechanism 8. The hopper drive units 6 are actuated by a single motor 17 depending from the lower side of the platform 12 at the central portion thereof.

Numeral 18 denotes a collecting chute supported on the base 10 below the weighing hoppers 5 for receiving the articles discharged by the weighing hoppers 5 and for supplying the articles to a packaging apparatus.

Figure 4:
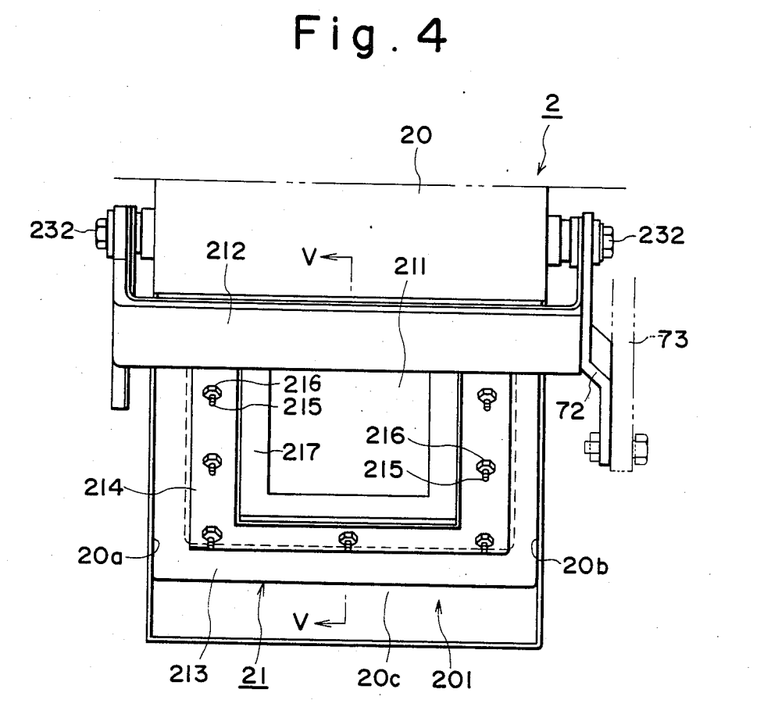
FIG. 4 is a front view of the hopper of FIG. 3 with a portion thereof omitted.
Figure 5:
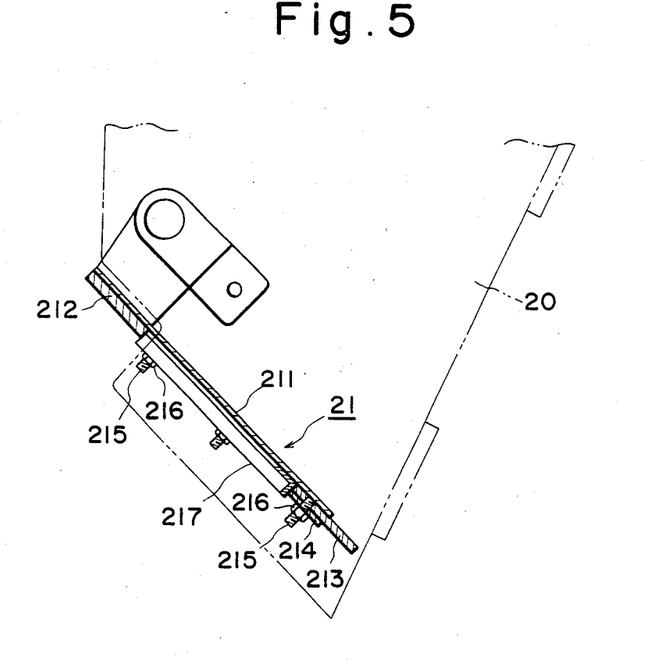
FIG. 5 is a longitudinal sectional view of the gate taken along line V—V of FIG. 4.

An embodiment of the present invention will now be described with reference to FIGS. 3 through 5, taking one of the pool hoppers 2 as an example.

The pool hopper 2 comprises a main body 20 having an upper opening and a lower article discharge port 201. Attached to the hopper main body 20, as by welding, are a bracket 210 for mounting the hopper main body on the platform 12, and a bracket 220 supporting a link mechanism 7. The link mechanism 7, which actuates the gate 21 for opening and closing the discharge port 201 of the hopper main body 20, comprises a drive link 71 pivotably supported by a shaft 231 on an end 221 of the bracket 220 that projects from one side of the hopper main body 20, a follower link 72 having one end 721 attached to a rotary shaft 232 of the gate 21 so as to be swingably movable with the gate 21, and an intermediate link 73 interconnecting the other end 722 of the follower link 72 and one end 711 of the drive link 71 by means of shafts 233 and 234. A return spring 240 is stretched between the other end 712 of the drive link 71 and an end portion 222 of the bracket 220 that extends away from the drive link 71, whereby the drive link 71 is biased for rotation in the direction of the arrow E at all times about the shaft 231. A stopper 250 is attached to the bracket 220 so that an extension 712 of the drive link 71 will come into abutting contact therewith to limit the rotation of the drive link 71. With the extension 712 of the drive link 71 in abutting contact with the stopper 250, as shown in FIG. 3, the link mechanism 7 will cause the gate 21 to close the discharge port 201. Further, in the condition illustrated, the link mechanism 7 acts as a toggle mechanism, so that a substantially linear relationship is established among the shaft 231 of the drive link 71, the shaft 234 connecting the drive link 71 and the intermediate link 73, and the shaft 233 connecting the intermediate link 234 and the follower link 72, as shown in FIG. 3. An operating lever 74 is secured to the drive link 71 for being pushed by the operating member 611 attached to the distal end of the push rod 61 of drive unit 6. When the operating lever 74 is pushed, the link mechanism 7 responds by opening the gate 21.

The gate 21 will now be described with reference to FIGS. 3, 4 and 5. The gate 21 comprises a base plate 211 axially secured to both sides of the hopper body 20 by the shafts 232, a reinforcing frame 212 fixed to the upper edge of the base plate 211, and a U-shaped flexible sheet 213 made of urethane or the like and affixed to the base plate 211 at the left, right and lower edges thereof. The flexible sheet 213 is affixed to the base plate 211 so as to surround the same from its left, right and lower sides. When the discharge port 201 of the hopper body 20 is closed by the gate 21, the flexible sheet 213 penetrates the interior of the discharge port 201 and comes into intimate contact with the inner side surfaces 20a, 20b of the hopper body 20, and with the inner surfaces 20c of the hopper body in the vicinity of the lower edge thereof. In the illustrated embodiment, the flexible sheet 213 is embraced by the base plate 211 and a U-shaped holder plate 214 and is retained by tightening nuts 216 on a plurality of screws 215, which project from the base plate 211, from the side of the holder plate 214. Secured to the central portion of the base plate 211 is a reinforcing member 217 having an L-shaped cross section. The reinforcing member 217 serves to position the flexible sheet 213 and the holder plate 214.

The operation of the automatic weighing apparatus will now be described.

Articles are dispsersively supplied from the dispersing table 14 through the troughs 16 and the pool hoppers 2 into the weighing hoppers 5 of the weighing machines 3, and are then weighed by the weight sensors 4. An optimum combination of measured weights is selected to obtain the prescribed fixed weight. The articles in the weighing hoppers 5 of the weighing machines 3 corresponding to the selected combination are discharged, en masse, into the underlying collecting chute 18 by opening the gates 51 of these weighing hoppers through operation of the corresponding drive units 6. The discharged articles are collected by the chute 18 and then supplied to a packaging apparatus (not shown) disposed below the collecting chute 18. Articles are immediately resupplied to the weighing hoppers 5 that have been discharged by corresponding pool hoppers 2 through operation of the corresponding drive units 6. This is in preparation for the next cycle of the weighing operation.

The pool hoppers 2 in the foregoing automatic weighing apparatus operate in the following manner.

Figure 3:
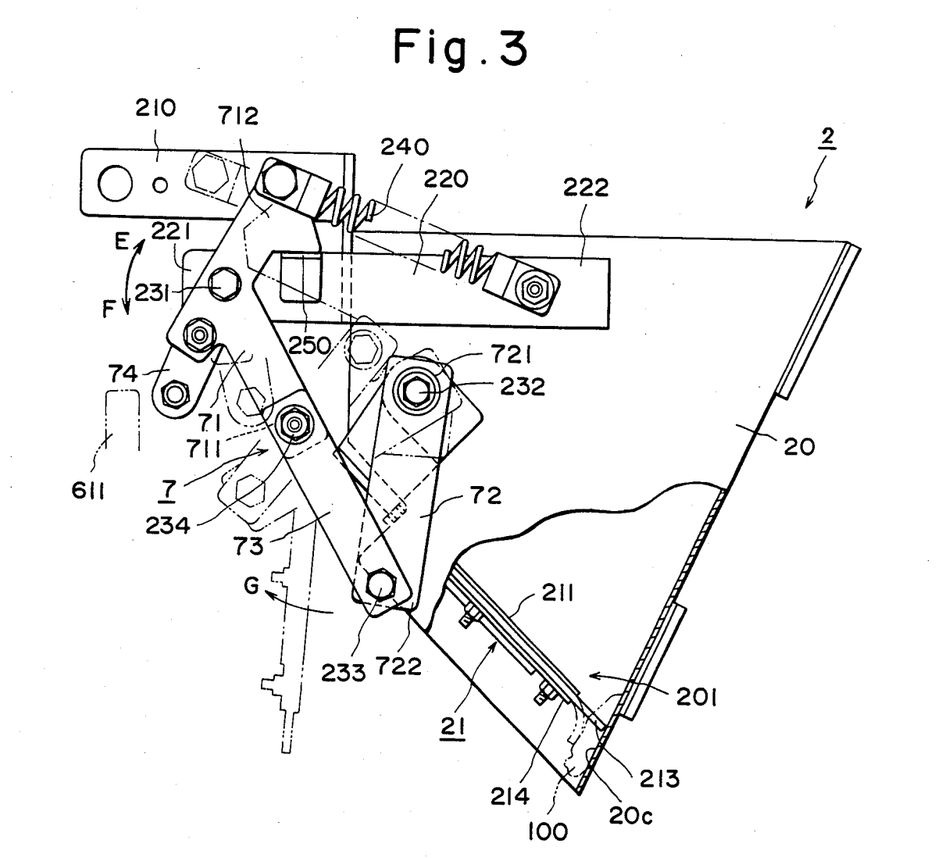
FIG. 3 is a side view of a first embodiment of a hopper according to the present invention, the hopper being equipped with a gate.

When the push rod 61 of the drive unit 6 is thrust forward, the operating member 611 attached to the distal end of the push rod 61 presses against the end portion of the operating lever 74, whereby the operating lever 74 and drive link 71 are angularly moved in unison in the direction of the arrow F against the force of the return spring 24 into the position shown by chain lines in FIG. 3. The turning movement of the drive link 71 causes the intermediate link 73 to turn the follower link 72 in the direction of the arrow G, whereupon the gate 21, as it turns with the follower link 72, opens the discharge port 201 of the hopper body 20. As the operating member 611 of the hopper drive unit 6 is retracted, the links 71, 72, 73 are angularly moved back to the solid-line position of FIG. 3 under the tension of the return spring 240, and the gate 21 closes the discharge port 201.

In a case where the articles being weighed are frozen foods or where the apparatus is installed in a freezer chamber, water from the food or from the surrounding air freezes in the vicinity of the hopper discharge port 201 and can to prevent full closure of the gate 21. However, since both side edges as well as the lower edge of the gate 21 are surrounded by the flexible sheet 213, the sheet 213 is deformed, by the deposited ice, shown at numeral 100, in the manner indicated by the chain line in FIG. 3. The link mechanism 7 is therefore capable of assuming the attitude indicated by the solid line in FIG. 3, namely, an attitude in which a linear relation is established among the shaft 231 of the drive link 71, the shaft 234 connecting the drive link 71 and the intermediate link 73, and the shaft 233 connecting the intermediate link 73 and the follower link 72. This brings the shafts 231, 233, 234 to their dead points, enabling the gate 21 to be locked into the prescribed closing position so that the gate will not open under the weight of the articles or by the impact of the articles when they are charged into the hopper.

FIGS. 6 through 10 illustrate a second embodiment of the present invention, in which the invention is directed to the weighing hoppers 5 of the automatic weighing apparatus shown in FIG. 2.

Figure 6:
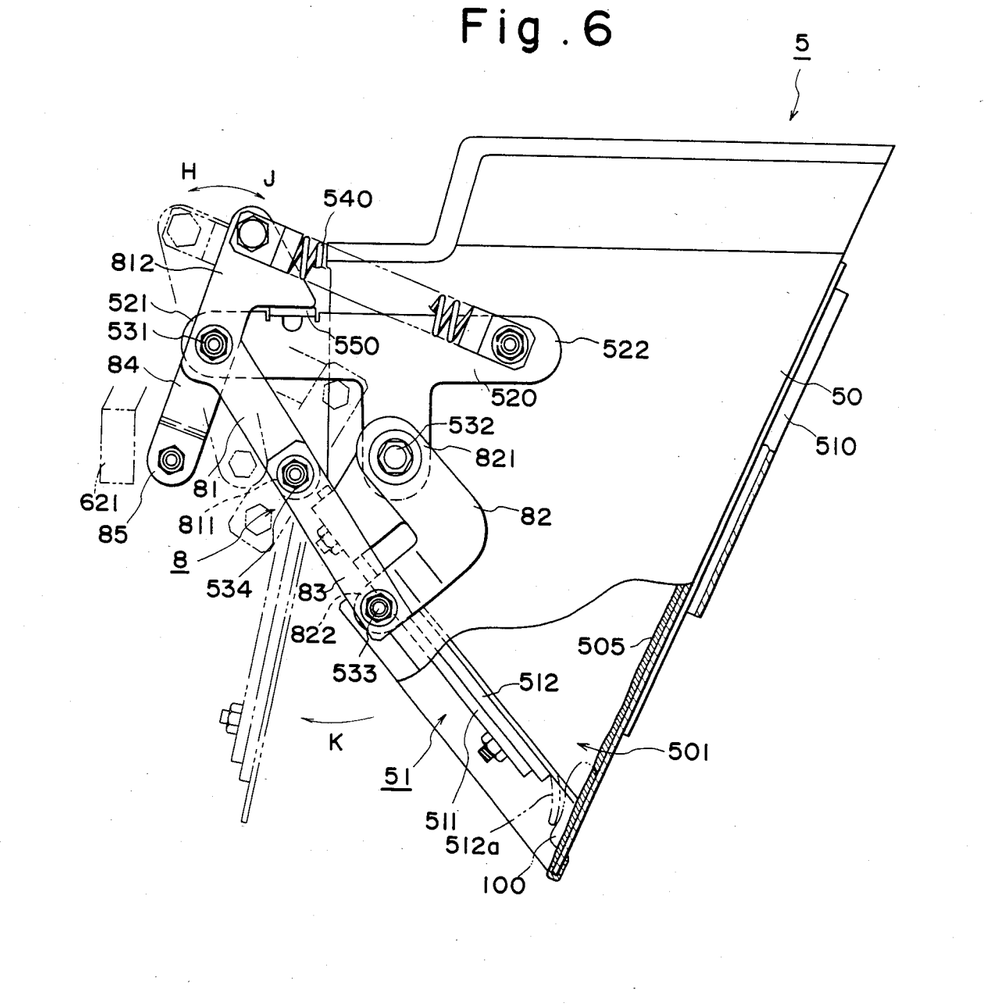
FIG. 6 is a side view of a second embodiment of a hopper according to the present invention, the hopper being equipped with a gate.

The weighing hopper 5 comprises a main body 50 having an upper opening and a lower article discharge port 501. The inner surface of the hopper main body 50 is coated with a heat insulator 505. Attached to the hopper main body 50, e.g., by welding, are a bracket 510 for mounting the hopper main body on the corresponding weight sensor 4, and a pair of brackets 520, 520, one on either side, for supporting a link mechanism 8. The link mechanism 8, which actuates a gate 51 for opening and closing the discharge port 501 of the hopper main body 50, comprises a drive link 81 pivotably supported by a shaft 531 extending between end portions 521, 521 of the brackets 520, 520, which end portions project from one side of the hopper main body 50, a follower link 82 having one end 821 thereof attached to a rotary shaft 532 of the gate 51 so as to be swingably movable with the gate 51, and an intermediate link 83 interconnecting the other end 822 of the follower link 82 and one end 811 of the drive link 81 by means of shafts 533 and 534. A return spring 540 is stretched between the other end 812 of the drive link 81 and an end portion 522 of the bracket 520 that extends away from the drive link 81, whereby the drive link 81 is biased for rotation in the direction of the arrow J about the shaft 531 at all times. A stopper 550 is attached to the bracket 520 so that an extension 812 of the drive link 81 will come into abutting contact therewith to limit the rotation of the drive link 81. With the extension 812 of the drive link 81 in abutting contact with the stopper 550, as shown in FIG. 6, the link mechanism 8 will cause the gate 51 to close the discharge port 501. Further, in the condition illustrated, the link mechanism 8 acts as a toggle mechanism, so that a substantially linear relationship is established among the shaft 531, the shaft 533 and the shaft 534, as shown in FIG. 6. An operating lever 85 is secured to the drive link 81 via a connecting member 84 for being pushed by the operating member 621 attached to the distal end of the push rod 62 of drive unit 6. When the operating lever 85 is pushed, the link mechanism 8 responds and opens the gate 51.

Figure 7:
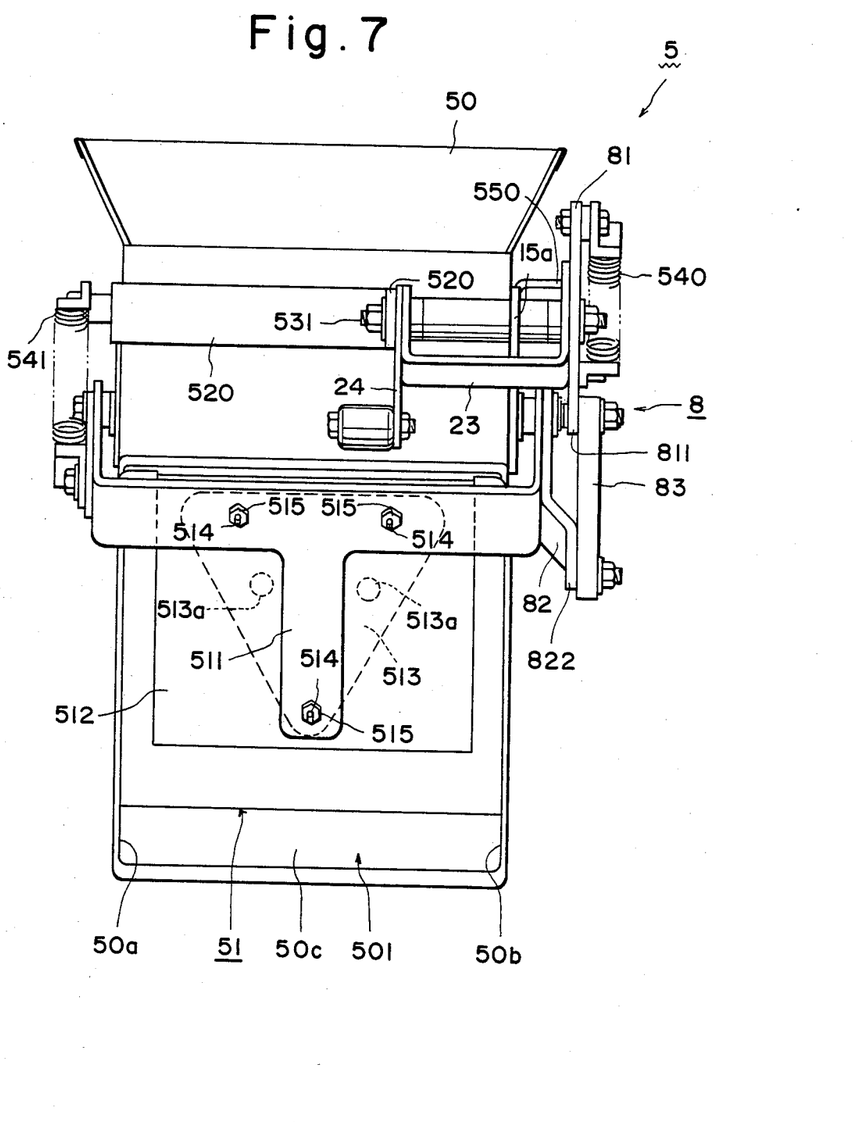
FIG. 7 is a front view of the hopper shown in FIG. 6.
Figure 8:
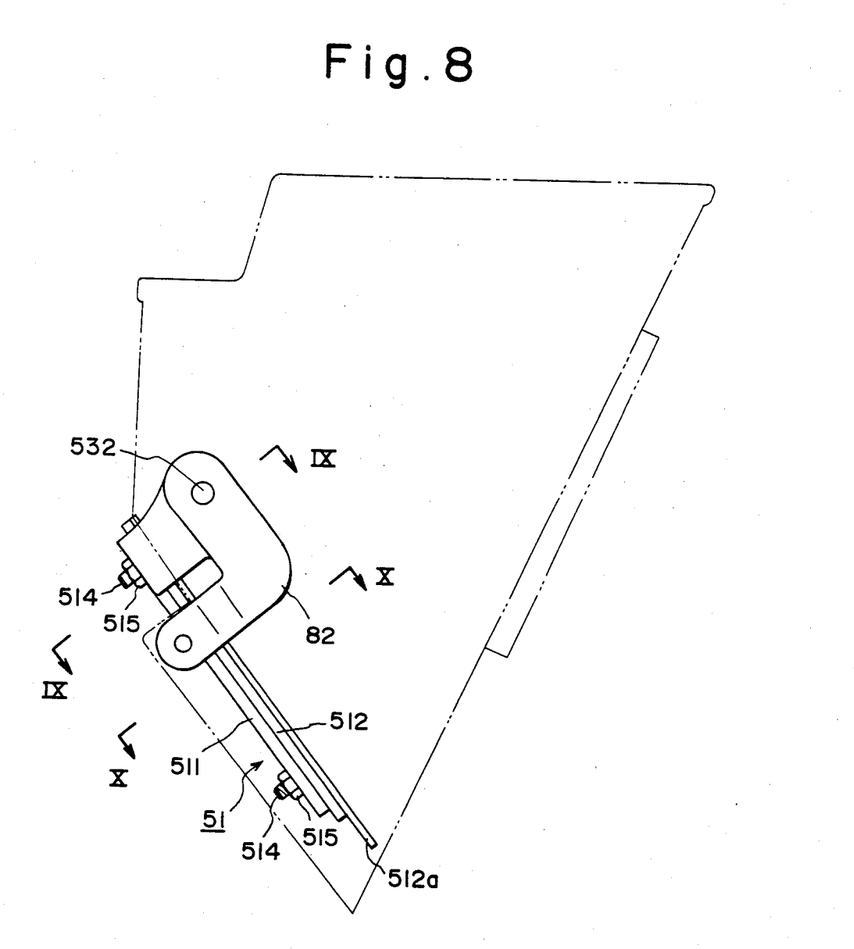
FIG. 8 is a side view of a gate provided on the hopper of FIG. 6.
Figure 9:
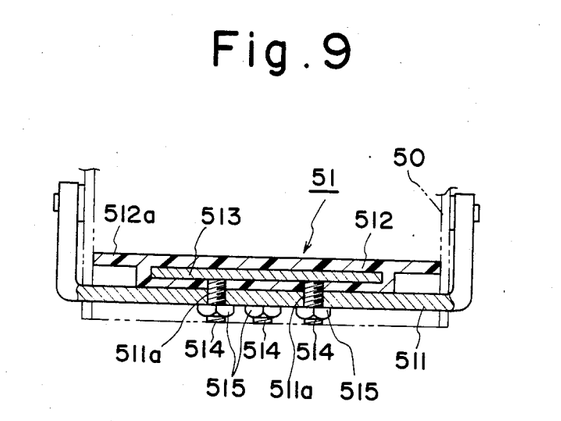
FIG. 9 is a transverse sectional view of the gate taken along line IX—IX of FIG. 8.

In addition to the return spring 540 in the link mechanism 8, the present embodiment includes a return spring 541 interposed between the gate 51 and the hopper body 50 for directly biasing the gate 51 in the closing direction. The return spring 541 is illustrated in FIG. 7.

Figure 10:
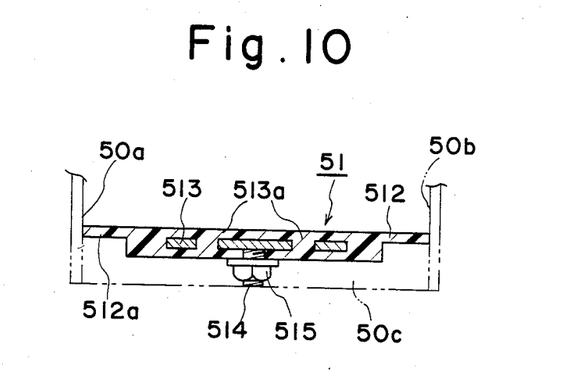
FIG. 10 is a transverse sectional view of the gate taken along line X—X of FIG. 8.

The gate 51 comprises a generally T-shaped frame 511 axially supported by the brackets 520, 520 attached to both sides of the hopper body 50 one end of the frame 511 being secured to the follower link 82 of the link mechanism 8, a gate body 512 comprising a flexible sheet of urethane or the like having the upper portion of its outer surface affixed to the frame 511, and a reinforcing plate 513 which is completely embedded within the gate body 512 at the time the gate body is molded. Implanted in the reinforcing plate 513 are three screws 514 which project from the outer surface of the gate body 512. The projecting portions of the screws 514 pass through holes 511a formed in the frame 511 and have nuts 515 screwed tightly thereon so that the gate body 512 having the embedded reinforcing plate 513 is coupled securely to the frame 511. The gate body 512 is sized so that its edge portion 512a will contact the left and right inner surfaces 50a, 50b, as well as the bottom inner surface 50c, of the discharge port 501 when the gate body 512 is at a closing position recessed a predetermined distance within the discharge port 501. The edge portion 512a of the gate body 512 is thin enough to exhibit excellent flexibility. In order to obtain a good connection between the gate body 512 and the reinforcing plate 513 embedded therein, the reinforcing plate 513 is provided with holes 513a, as shown in FIGS. 7 and 10. When the gate body 512 is molded, the flexible molding material constituting the gate body fills the holes 513a so that the inner and outer surfaces of the gate body 512 embrace the reinforcing plate 513 tightly to achieve a firm connection between the gate body and the plate. It should be noted that the frame 511 and the follower link 82 of the link mechanism 8 may be formed as a unitary body rather than as separate elements.

In accordance with the foregoing construction of the hopper in the present embodiment, the gate body 512 of the gate 51 is composed of a flexible material. Therefore, when the gate 51 is closed, the outer edge portion 512 of the sheet body 512 is deformed as in the first embodiment by ice 100 deposited in the vicinity of the discharge port 501 of the hopper body 51. The link mechanism 8 is therefore capable of assuming the attitude indicated by the solid line in FIG. 6, namely an attitude in which a linear relation is established among the support shaft 531 of the drive link 81, the shaft 534 connecting the drive link 81 and the intermediate link 83, and the shaft 533 connecting the intermediate link 83 and the follower link 82. This brings the shafts 531, 533, 534 to their dead points, enabling the gate 51 to be locked into the prescribed closing position.

In the second embodiment of the present invention described above, the frame 511 and reinforcing plate 513 of the gate 51 are joined externally of the gate body 512 so that the entirety of the inner surface of the gate body is covered completely and in flat fashion by the flexible sheet of urethane or the like. This assures the existence of sanitary conditions by preventing food and the like from remaining attached to the inner surface of the gate 51.

As many apparently widely different embodiments of the present invention can be made without departing from the spirit and scope thereof, it is to be understood that the invention is not limited to the specific embodiments thereof except as defined in the appended claims.

What I claim is:

1. A hopper in an automatic weighing apparatus, comprising:
   a hopper body having an inner surface, a lower end and a discharge port at the lower end of the hopper body;
   a gate, swingably supported on the hopper body, for opening and closing the discharge port, including
   a base plate provided on the gate and formed smaller than the discharge port, and
   a flexible sheet, affixed to the base plate, having an edge portion for resiliently contacting the inner surface of the hopper body in the discharge port.

2. A hopper according to claim 1, wherein the flexible sheet has a thickness and the edge portion for resiliently contacting the inner surface of the hopper body has a reduced thickness.

3. A hopper according to claim 1, wherein the flexible sheet has right and left side edges and the flexible sheet is affixed to the base plate at the right and left side edges of the flexible sheet.

4. A hopper according to claim 1, wherein the inner surface of the hopper body is covered with an insulator.

5. A hopper according to claim 1, further comprising means, mounted on the hopper body and attached to the gate, for opening the discharge port and for maintaining the gate in a position closing the discharge port.

6. A hopper in an automatic weighing apparatus, comprising:
   a hopper body having an inner surface, a lower end and a discharge port at the lower end of the hopper body;
   a gate, swingably supported on the hopper body, for opening and closing the discharge port, including
   a base plate provided on the gate and formed smaller than the discharge port;
   a flexible sheet having right and left side edges and being affixed to the base plate at the right and left side edges and having an edge portion for resiliently contacting the inner surface of the hopper body in the discharge port; and
   a heat insulator covering the inner surface of the hopper body.

7. A hopper according to claim 6, wherein the flexible sheet has a thickness and the edge portion for resiliently contacting the inner surface of the hopper body has a reduced thickness.

8. A hopper according to claim 6, further comprising means, mounted on the hopper body and attached to the gate, for opening the discharge port and for maintaining the gate in a position closing the discharge port.

9. A hopper in an automatic weighing apparatus, comprising:
   a hopper body having an inner surface, a lower end and a discharge port at the lower end of the hopper body; and
   a gate, swingably supported on the hopper body, for opening and closing the discharge port, including a flexible sheet having an edge portion for resiliently contacting the inner surface of the hopper body in the discharge port and a reinforcing plate attached to the flexible sheet.

10. A hopper according to claim 6, wherein the flexible sheet has a thickness and the edge portion for resiliently contacting the inner surface of the hopper body has a reduced thickness.

11. A hopper according to claim 6, wherein the reinforcing plate is embedded within the flexible sheet.

12. A hopper according to claim 6, wherein the inner surface of the hopper body is covered with an insulator.

13. A hopper according to claim 6, wherein the gate has an upper portion, further comprising a frame secured to the upper portion of the gate and swingably supporting the gate on the hopper body.

14. A hopper according to claim 9, further comprising means, mounted on the hopper body and attached to the gate, for opening the discharge port and for maintaining the gate in a position closing the discharge port.

15. A hopper in an automatic weighing apparatus, comprising:
   a hopper body having an inner surface, a lower end and a discharge port at the lower end of the hopper body;
   a gate, swingably supported on the hopper body for opening and closing the discharge port, the gate including a flexible sheet having an edge portion for resiliently contacting the inner surface of the hopper body in the discharge port, a reinforcing plate embedded within the flexible sheet, and a frame secured to the gate and swingably supported on the hopper body; and
   a heat insulator covering the inner surface of the hopper body.

16. A hopper according to claim 15, wherein the flexible sheet has a thickness and the edge portion for resiliently contacting the inner surface of the hopper body has a reduced thickness.

17. A hopper according to claim 15, further comprising means, mounted on the hopper body and attached to the gate, for opening the discharge port and for maintaining the gate in a position closing the discharge port.

* * * * *